United States Patent [19]
Muehlberger et al.

[11] Patent Number: 4,808,042
[45] Date of Patent: Feb. 28, 1989

[54] POWDER FEEDER

[75] Inventors: Erich Muehlberger, San Clemente; Robert P. de la Vega, Santa Maria, both of Calif.

[73] Assignee: Electro-Plasma, Inc., Irvine, Calif.

[21] Appl. No.: 736,972

[22] Filed: May 22, 1985

Related U.S. Application Data

[63] Continuation of Ser. No. 387,356, Jun. 11, 1982, abandoned.

[51] Int. Cl.$^4$ .............................................. B65G 53/32
[52] U.S. Cl. ...................................... 406/66; 406/135; 406/146
[58] Field of Search ...................... 406/62–68, 406/52, 134, 135, 146; 222/196, 197, 226, 227, 236, 238, 239, 242, 252, 254, 263, 265, 271, 294, 399, 410

[56] References Cited

U.S. PATENT DOCUMENTS

| | | | |
|---|---|---|---|
| 1,737,090 | 11/1929 | Meyers | 406/135 X |
| 1,991,403 | 2/1935 | McManamna | 406/146 X |
| 2,152,632 | 4/1939 | Cassiere | 406/67 |
| 2,599,304 | 6/1952 | Weber | 406/66 |
| 3,201,001 | 8/1965 | Roberts et al. | 406/135 X |
| 4,025,122 | 5/1977 | Diemert | 406/63 |
| 4,176,987 | 12/1979 | Reed et al. | 406/63 |
| 4,376,600 | 3/1983 | Egli | 406/63 |

FOREIGN PATENT DOCUMENTS

| | | | |
|---|---|---|---|
| 2450245 | 5/1976 | Fed. Rep. of Germany | 406/66 |
| 1416165 | 12/1975 | United Kingdom | 406/63 |

Primary Examiner—Andres Kashnikow
Attorney, Agent, or Firm—Scherlacher, Mok & Roth

[57] ABSTRACT

A powder feeder for dispensing controlled amounts of powder into a gas stream in a supersonic plasma spraying environment utilizes a stir spindle and a feed impeller mounted on a rotatable first drive shaft at the bottom of a powder cannister to agitate and mix the powder and then dispense the powder in controlled amounts from an aperture in the bottom of the cannister as the first drive shaft is driven by a motor. The controlled amounts of powder dispensed through the aperture in the bottom of the cannister are directed by a conduit through an aperture in the upper end of a housing and into a plurality of slots circumferentially formed about the outer periphery of a feedwheel mounted within the housing to be rotatably driven by a second drive shaft which is also coupled to be driven by the motor. The slots which are uniform in size have bottom surfaces and opposite side surfaces formed by opposite vanes extending upwardly from the upper surface of the feedwheel between a first hollow tube mounted in a fixed location relative to the feedwheel so as to direct a gas flow through the slots and an opposite second hollow tube disposed to receive the gas flow and the powder loaded into the slots. The constant action of the stir spindle, the feed impeller and the feedwheel provides a relatively constant, uniform supply of the powder to the gas stream, even in the face of varying operating conditions.

20 Claims, 12 Drawing Sheets

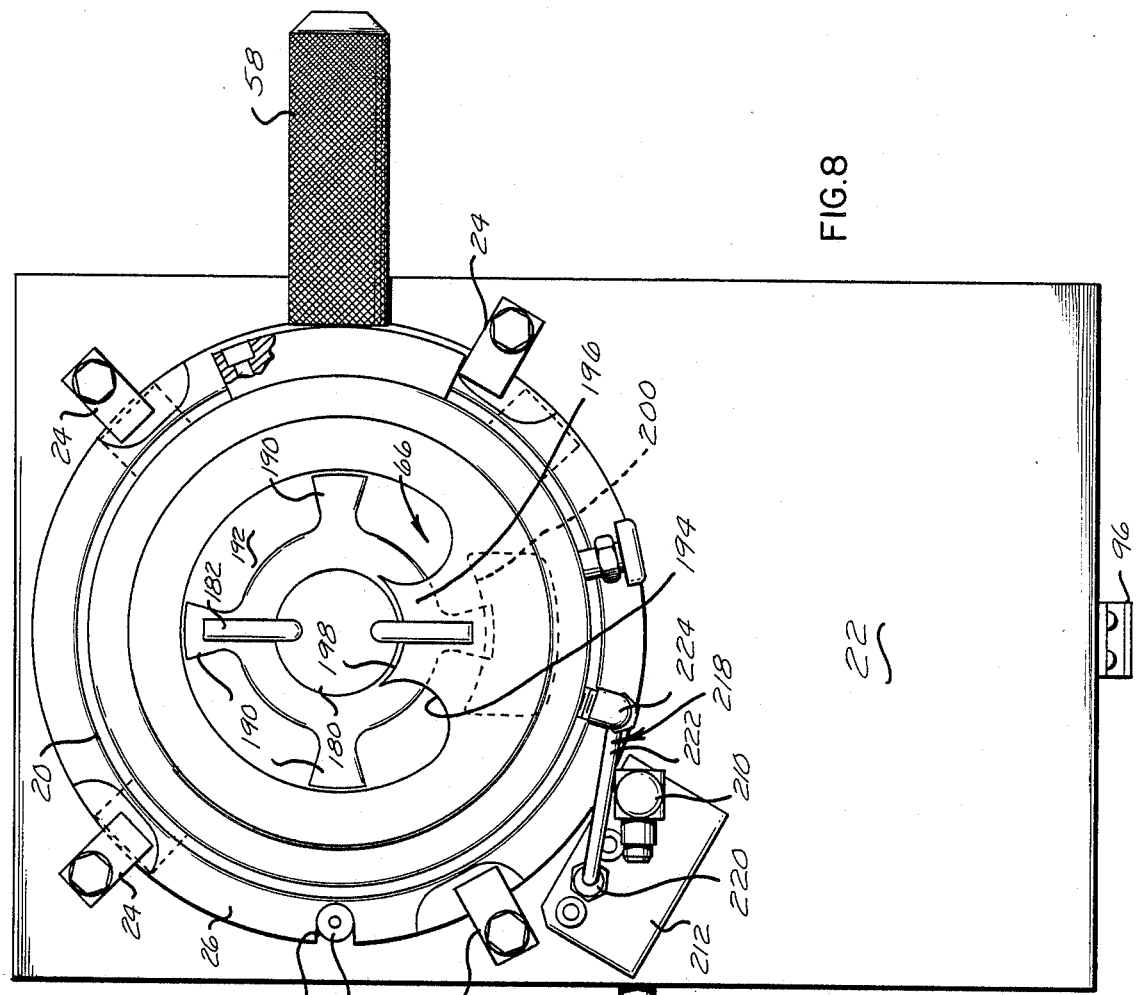

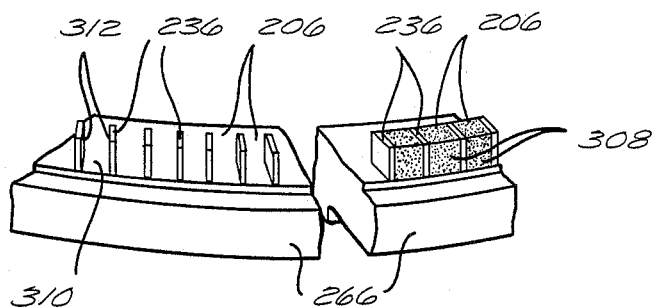
FIG. 15
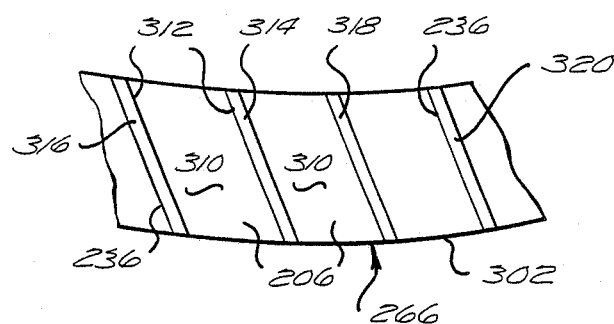
FIG. 16
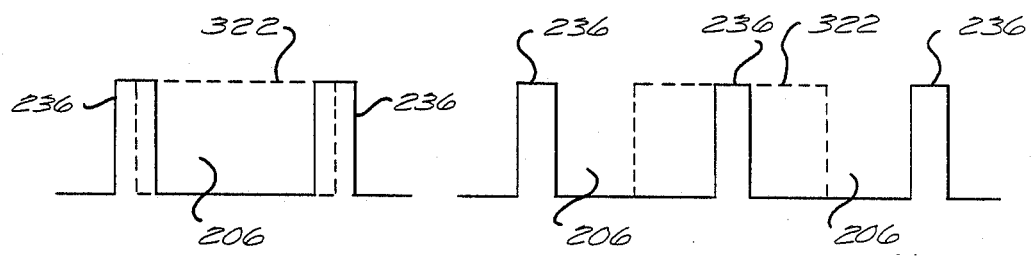
FIG. 17A
FIG. 17B

POWDER FEEDER

This is a continuation of co-pending application Ser. No. 387,356 filed on June 11, 1982, now abandoned.

BACKGROUND OF THE INVENTION

1. Field of the Invention

The present invention relates to arrangements for feeding controlled amounts of powder into a gas stream, and more particularly to powder feeders for supplying controlled amounts of powder in plasma spraying systems.

2. History of the Prior Art

In plasma spraying systems some means must be provided for feeding controlled amounts of powder into a gas stream used to form the plasma spray. The powder which is typically of a metallic composition is typically heated prior to being fed into a passing gas stream at a relatively constant rate so that the spraying of the powder onto a workpiece within the plasma system is relatively uniform.

It is very important for most applications of a plasma spraying system that the feeding of powder into the gas stream be accomplished at a constant rate so that the quantity of powder within the gas remains relatively uniform. Variations in the supply of powder to the gas stream result in spraying nonuniformities and generally in difficulty in controlling the plasma spraying operation. The uniformity in the supply of the powder must be maintained in the face of varying factors such as variations in the quantity of powder stored within the powder feeder and the tendency of the powder to cake or sometimes harden under varying conditions of humidity so as to fail to flow freely and evenly into the apparatus which feeds it into the gas stream.

One type of powder feeder commonly employed in plasma spraying systems utilizes a hollow, generally cylindrical cannister mounted at approximately a 45° angle and adapted to receive and store a quantity of powder therein. A rotating wheel at the lower end of the cannister is at least partially disposed within the cannister so as to load powder into a succession of slots spaced about the outer periphery of the wheel with the help of a tamper for periodically contacting the slots. As the wheel continues to rotate, the slots filled with powder are moved into the path of a gas stream such that the powder within the slots is entrained into the stream being directed through the slots.

Powder feeders of the type just described have been found to have a number of shortcomings which hamper their ability to provide a continuous, uniform supply of the powder into the gas stream. Thus, even though the powder is tamped into the slots in the wheel, at least some of the powder frequently falls out of the slot before the slot can be moved from the supply of powder at the bottom of the cannister to the path of the gas stream. Moreover, even where the successive slots remain substantially completely filled with powder, the areas of the wheel between adjacent slots periodically move into the path of the gas stream so as to interrupt the supply of powder to the gas stream. The height of the powder within the cannister plays a definite role in the uniformity of powder feeding, even when other factors are favorable. Loading of the powder into the slots may be hampered by varying conditions of humidity and other factors which may cause the powder to cake or harden or otherwise refuse to flow smoothly and evenly into the slots.

Accordingly, it would be desirable to provide a powder feeder capable of providing a relatively uniform supply of powder into a gas stream, even in the face of varying conditions. Such a feeder should lend itself to relatively simple driving and control. Furthermore, such feeder should be capable of providing a relatively uniform and continuous supply of powder from a storage vehicle for the powder in the face of variations in humidity and other conditions.

BRIEF DESCRIPTION OF THE INVENTION

Powder feeders in accordance with the invention utilize a primary assembly at the bottom of a storage cannister for the powder to dispense controlled amounts of the powder to a secondary assembly where the dispensed powder is continously loaded into slots of generally uniform size for feeding into a gas stream.

The primary assembly includes a stir spindle mounted at a top of a generally vertically disposed first drive shaft for agitating and mixing powder at the bottom of the cannister as the first drive shaft is rotatably driven. A feed impeller mounted on the first drive shaft beneath the stir spindle has a plurality of blades at the outer periphery thereof defining apertures therebetween which serve to dispense controlled amounts of the powder agitated and broken up by the stir spindle through an aperture in the lower end of the cannister as the first drive shaft is driven.

A conduit couples the aperture in the lower end of the cannister to an aperture in the upper end of a housing which encloses a feedwheel therein so as to feed the quantities of powder dispensed by the feed impeller into a succession of slots circumferentially disposed about the outer periphery of the feedwheel as the feedwheel is rotatably driven by a second drive shaft on which it is mounted. The feedwheel, housing and second drive shaft comprise the secondary assembly which serves to feed the powder dispensed by the primary assembly into a gas stream. The feedwheel is mounted under and to the side of the cannister and the feed impeller so that the axis of rotation of the second drive shaft is generally parallel to and yet spaced apart from the axis of rotation of the first drive shaft. Each of the slots within the outer periphery of the feedwheel has a bottom surface and a pair of opposite side surfaces defined by vanes which extend upwardly from the upper surface of the feedwheel between a first hollow tube mounted at a fixed location relative to the feedwheel to provide a gas stream through the slots and an opposite second hollow tube disposed to receive the gas stream and the powder entrained into the stream from the slots. The vanes are of uniform width and relative spacing so as to present a constant cross-sectional area of powder loaded in the slots to the gas flow "window" between the opposite first and second hollow tubes.

The first and second drive shafts are driven from a common motor by an arrangement of shafts and gears. The arrangement of shafts and gears rotatably drives the second drive shaft at a speed which is different from and forms a fixed ratio with the speed of the first drive shaft. This insures that the correct amount of powder is dispensed by the feed impeller to properly fill the slots in the feedwheel as the rotational speed of the feedwheel is varied. The single motor for driving the first and second drive shafts is easily servo controlled by monitoring the feed rate by electronic or other means and using that measure to control the motor speed.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 8 is a top view of the arrangement of FIG. 6;

FIG. 9 is a side view, partly in section, of portions of the powder feeder of FIG. 1 used to provide a gas stream through the powder feeder;

FIG. 15 is a perspective view of a portion of the feedwheel of FIG. 13 showing the details of the slot forming vanes thereon;

FIG. 16 is a top view of a portion of the feedwheel of FIG. 13 showing the orientation of the vanes; and FIGS. 17A and 17B are two different side views of portions of the feedwheel of FIG. 13 showing a gas stream "window" in relation to the vanes.

DETAILED DESCRIPTION

Figure 1:
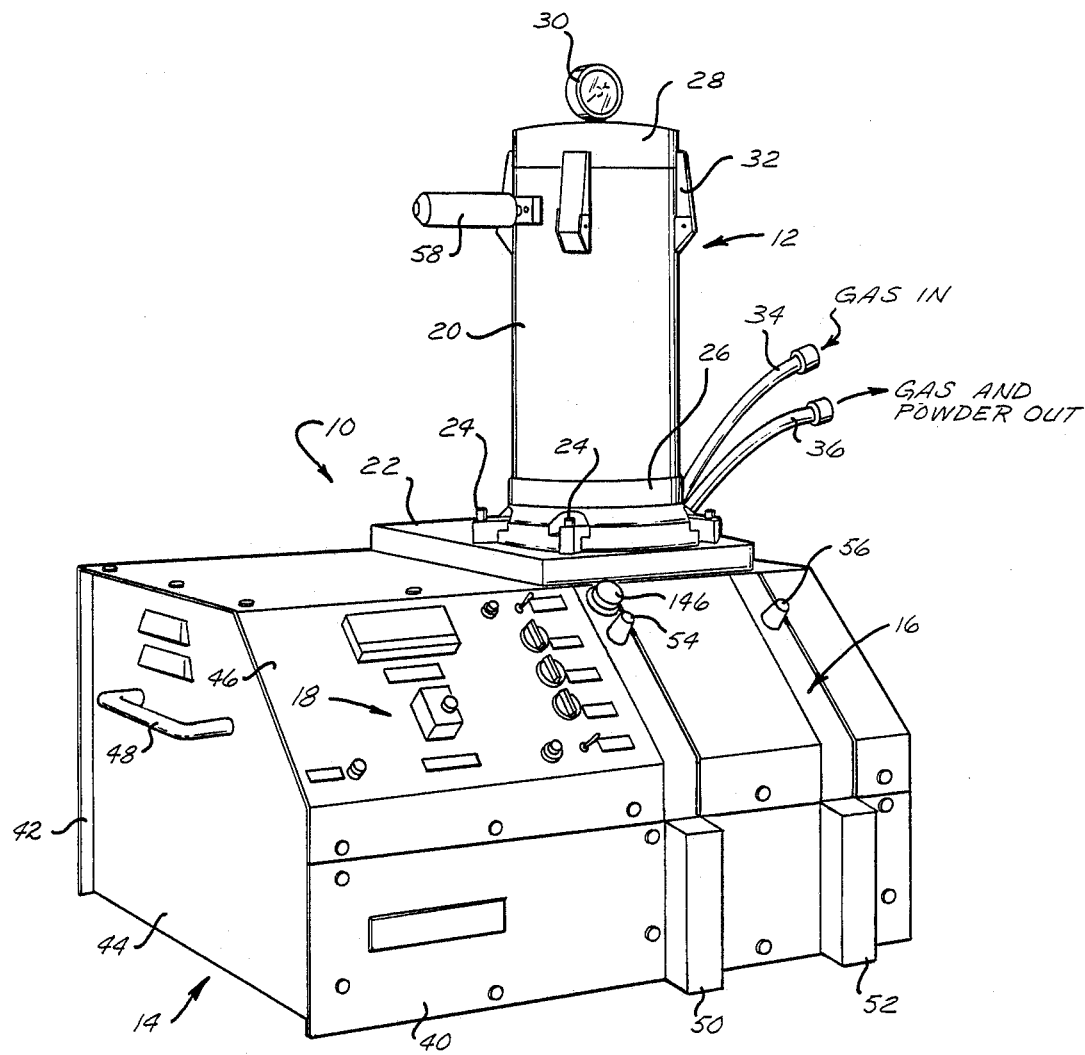
FIG. 1 is a perspective view of a powder feeder in accordance with the invention.

FIG. 1 depicts a powder feeder 10 in accordance with the invention. The powder feeder 10 includes an upper hopper assembly 12 mounted on the top of a main chassis 14 for housing a lower hopper assembly 16 beneath the upper hopper assembly 12 and an electronic drive control assembly 18.

The upper hopper assembly 12 includes a hollow, generally cylindrical, vertically disposed powder cannister 20 for containing a quantity of powder to be fed into a gas stream. The cannister 20 is mounted on the upper surface of a main plate 22 by a plurality of cannister clamps 24 which secure a base 26 of the cannister 20 to the main plate 22. Access to the cannister 20 for purposes of loading powder therein is provided by a cannister window subassembly 28 mounting a pressure gauge 30 at the top thereof. The cannister window subassembly 28 which is normally mounted on the top of the cannister 20 may be removed by releasing a plurality of latches 32 so that the cannister 20 may be filled with powder. With the cannister window subassembly 28 held in place on top of the cannister 20 by the latches 32, the powder is sealed within the cannister 20 and pressure may be applied to and maintained within the interior of the cannister 20. The pressure gauge 30 provides an indication of the amount of pressure at the top of the cannister 20 and above the powder within the cannister 20.

As described in detail hereafter the upper hopper assembly 12 includes a primary assembly located at the base of the cannister 20 just above the main plate 22 for mixing and agitating powder within the cannister 20 and dispensing controlled amounts of the powder to a secondary assembly mounted immediately below the main plate 22. The secondary assembly includes a plurality of slots into which the powder from the primary assembly is loaded for feeding into a gas stream provided by a gas source hose 34. The gas stream with powder fed therein exits the powder feeder 10 via a powder hose 36 from which it is directed to a plasma spraying system or other utilizing system. The gas stream within the gas source hose 34 is provided by pumps or other devices for providing the gas under pressure.

The main chassis 14 includes opposite front and back plates 40 and 42 respectively, opposite side plates 44 and a control panel 46. Each of the opposite side plates 44 has a handle 48 mounted thereon for ease in carrying the powder feeder 10.

The main chassis 14 encloses the lower hopper assembly 16 in the region of the upper hopper assembly 12. As described hereafter the lower hopper assembly 16 includes a motor coupled through various shafts and gears to drive both the primary and the secondary assemblies within the upper hopper assembly 12. The motor as well as various other portions of the powder feeder 10 are controlled by the electronic drive control assembly 18, part of which is mounted on the control panel 46 and part of which is contained within the main chassis 14. The control panel 46 includes fuses, indicator lights and toggle switches. The various controls are used to control such things as the heat applied to powder stored within the cannister 20 by heating elements (not shown) mounted within the sides of the cannister 20. In particular, the controls shown on the control panel 46 utilize a servo system to accurately and precisely control the amount of powder introduced into the gas stream in the gas source hose 34. The quantity of powder in the gas stream exiting the powder hose 36 can be measured and applied to the servo system to control the speed of the motor which drives the primary and secondary assemblies at the base of the cannister 20.

Figure 2:
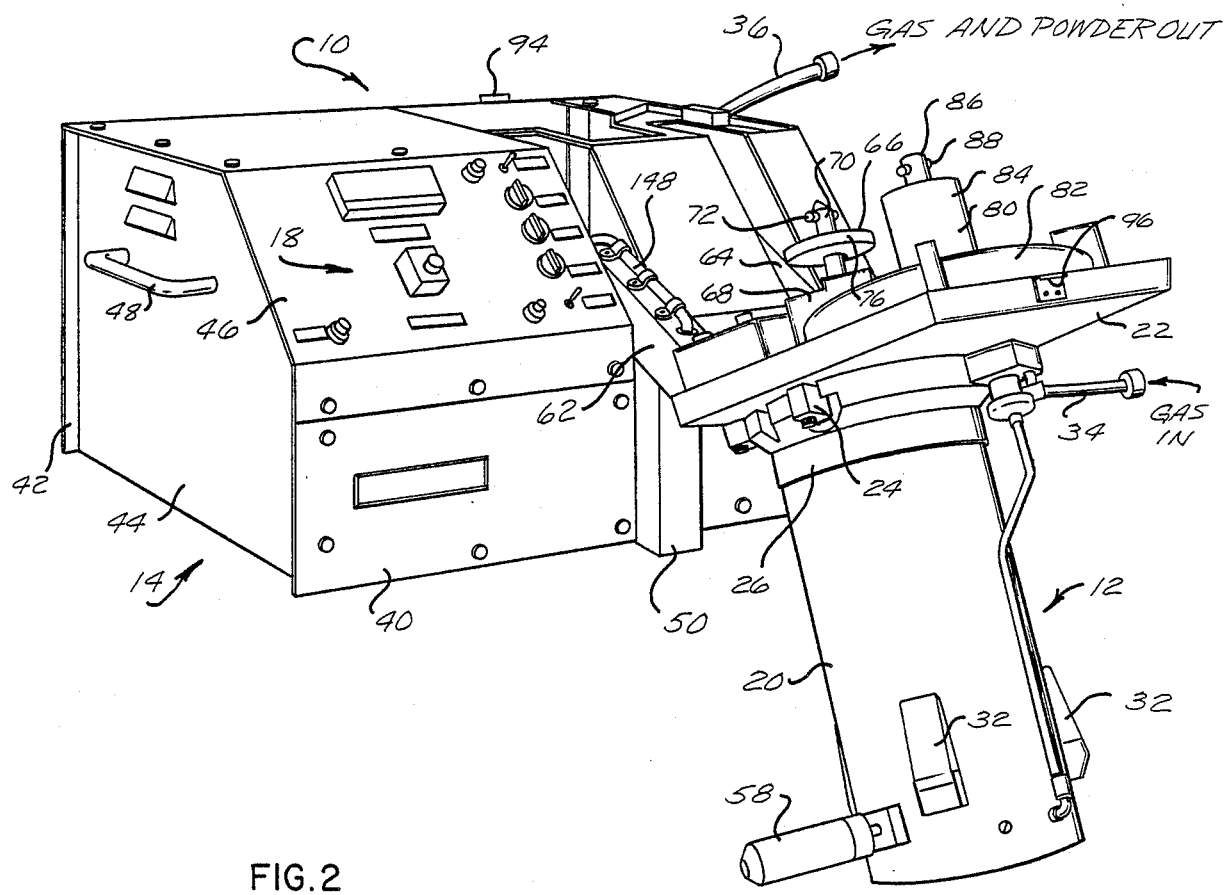
FIG. 2 is a perspective view of the powder feeder of FIG. 1 with the cannister pivoted into a powder dumping position.

Mounted on the front plate 40 is a pair of stop blocks 50 and 52, the upper surfaces of which respectively receive a pair of stoppers 54 and 56 when the upper hopper assembly 12 is pivoted into a powder dumping position as shown in FIG. 2. Movement of the upper hopper assembly 12 into the powder dumping position is aided by a dump handle 58 coupled to and extending outwardly from the side of the cannister 20. The powder dumping position enables the cannister 20 to be emptied of the powder therein without turning the entire powder feeder 10 upsidedown. As shown in FIG. 2 the upper hopper assembly 12 is pivotally coupled to the lower hopper assembly 16 within the main chassis 14 by a left pivot arm 62 containing the stopper 54 and a right pivot arm 64 containing the stopper 56. With the upper hopper assembly 12 in the powder dumping position shown in FIG. 2, the stoppers 54 and 56 rest on the top surfaces of the stop blocks 50 and 52 respectively. The cannister window subassembly 28 at the top of the cannister 20 can be removed by opening the latches 32 so as to allow any powder remaining within the cannister 20 to spill out.

Figure 3:
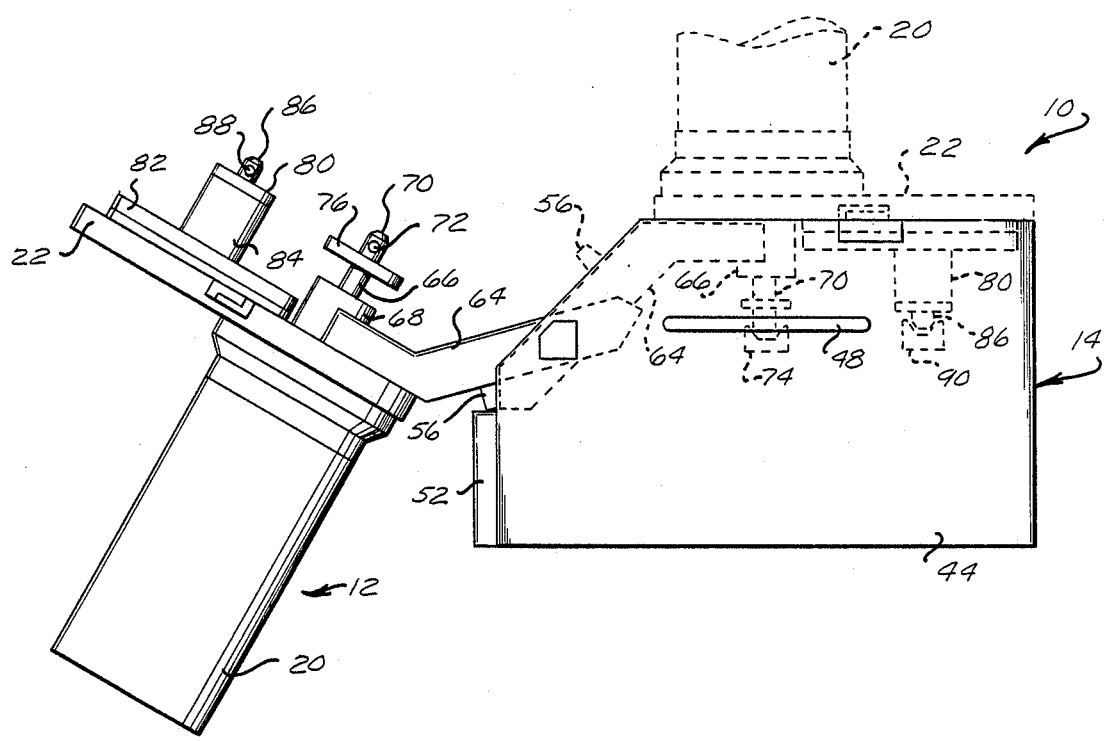
FIG. 3 is a right side view of the powder feeder of FIG. 1 with the cannister pivoted into the position shown in FIG. 2.

As seen in FIGS. 2 and 3 the upper hopper assembly 12 includes a primary assembly 66 which is principally contained at the base of the powder cannister 20 above the base plate 22 but which has a primary bearing housing 68 extending below the base plate 22 and having a primary drive shaft 70 journaled therein. The primary drive shaft 70 has a drive pin 72 extending transversely through the shaft 70 at the lower end of the shaft 70. The drive pin 72 and the lower end of the primary drive shaft 70 are engaged by a primary spindle 74 shown in dotted outline in FIG. 3 when the upper hopper assembly 12 is in the upright position. The primary spindle 74 rotatably drives the primary drive shaft 70 to provide mixing of the powder within the powder cannister 20 and dispensing of controlled amounts of the powder at the base of the cannister 20 as described hereafter. Mounted on the primary drive shaft 70 immediately above the drive pin 72 is a primary wheel 76. The primary wheel 76 allows manual rotation of the primary drive shaft 70 to align the drive pin 72 for proper insertion into the primary spindle 74 as required when the hopper assembly 12 is returned to the upright position shown in FIG. 1 from the dumping position shown in FIG. 2.

As shown in FIGS. 2 and 3 the upper hopper assembly 12 also includes a secondary assembly 80 which is mounted immediately below the base plate 22 and which includes an enclosed housing 82 coupled to the underside of the base plate 22, a secondary bearing housing 84 extending from the underside of the enclosed housing 82, and a secondary drive shaft 86 journaled within and extending out of the bottom of the secondary bearing housing 84. The secondary drive shaft 86 is rotatably mounted along a generally vertical axis parallel to the vertical axis of rotation of the primary drive shaft 70. A drive pin 88 extends transversely through the secondary drive shaft 86 adjacent the lower end of the shaft 86. The drive pin 88 and the lower end of the secondary drive shaft 86 are engaged by a secondary spindle 90 shown in dotted outline in FIG. 3 when the upper hopper assembly 12 is in the upright position. As described hereafter the secondary spindle 90 rotatably drives the secondary drive shaft 86 to drive a secondary feedwheel 206 within the enclosed housing 82, the secondary feedwheel 206 receiving the controlled amounts of powder dispensed at the base of the powder cannister 20 and introducing the powder into the gas stream flowing in through the gas source hose 34 and out through the powder hose 36. The primary and secondary spindles 74 and 90 remain in the positions shown in FIG. 3 and therefore disengage from the primary drive shaft 70 and the secondary drive shaft 86 respectively when the upper hopper assembly 12 is rotated into the powder dumping position.

As seen in FIG. 2 a latch 94 is mounted on the back plate 42 of the main chassis 14 adjacent an upper edge of the back plate 42. A strike 96 is mounted on the back edge of the base plate 22. The latch 94 may be used to engage the strike 96 and thereby lock the upper hopper assembly 12 in the upright position shown in FIG. 1.

When it is desired to dump powder from the powder cannister 20, the cannister window subassembly 28 is removed from the top of the cannister 20, the latch 94 is uncoupled from the strike 96, and the dump handle 58 is grasped and used to pivot the upper hopper assembly 12 into the powder dumping position shown in FIG. 2.

Figure 4:
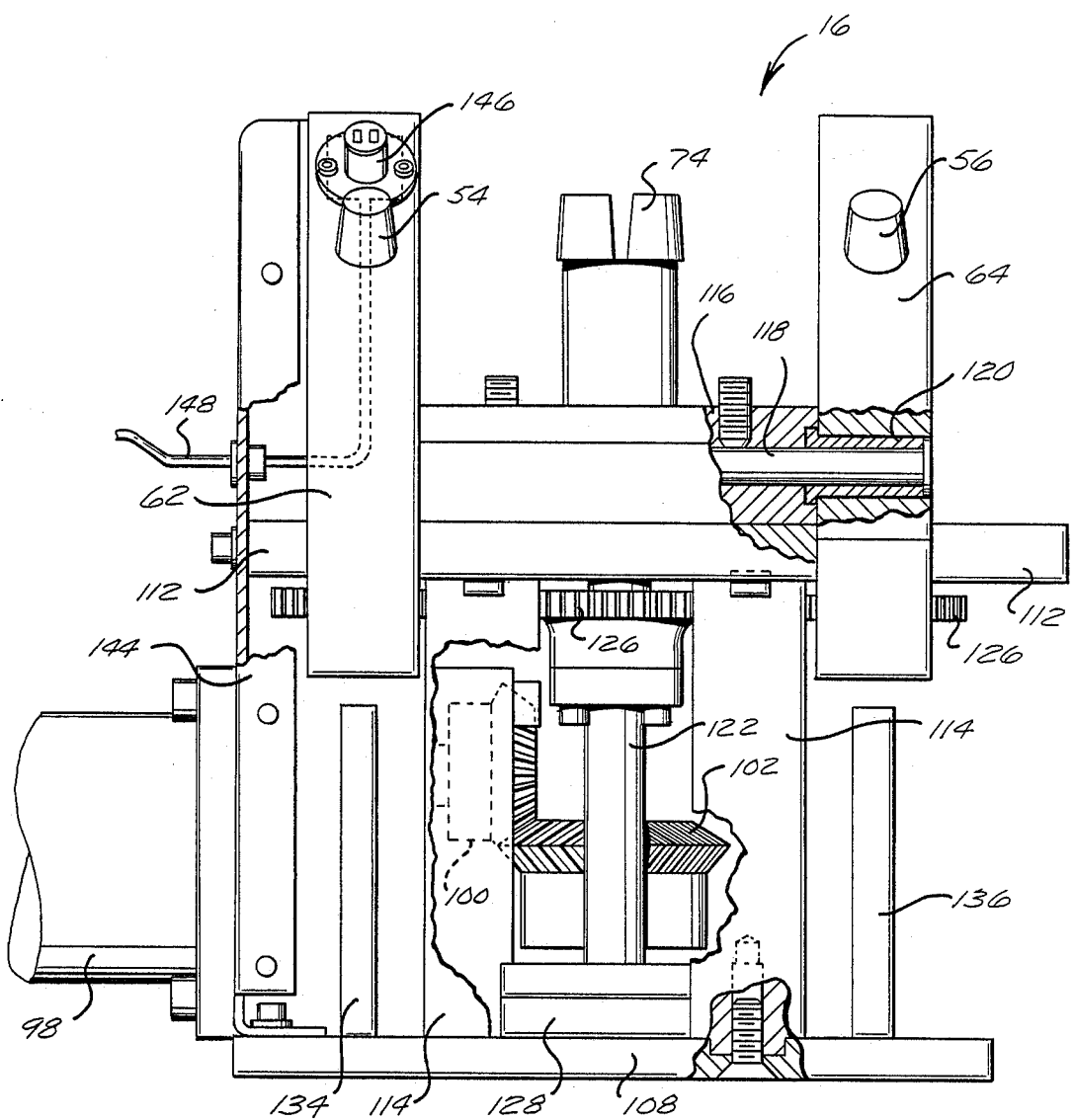
FIG. 4 is a front view of a portion of the powder feeder of FIG. 1 used to drive primary and secondary assemblies at the base of the cannister.
Figure 5:
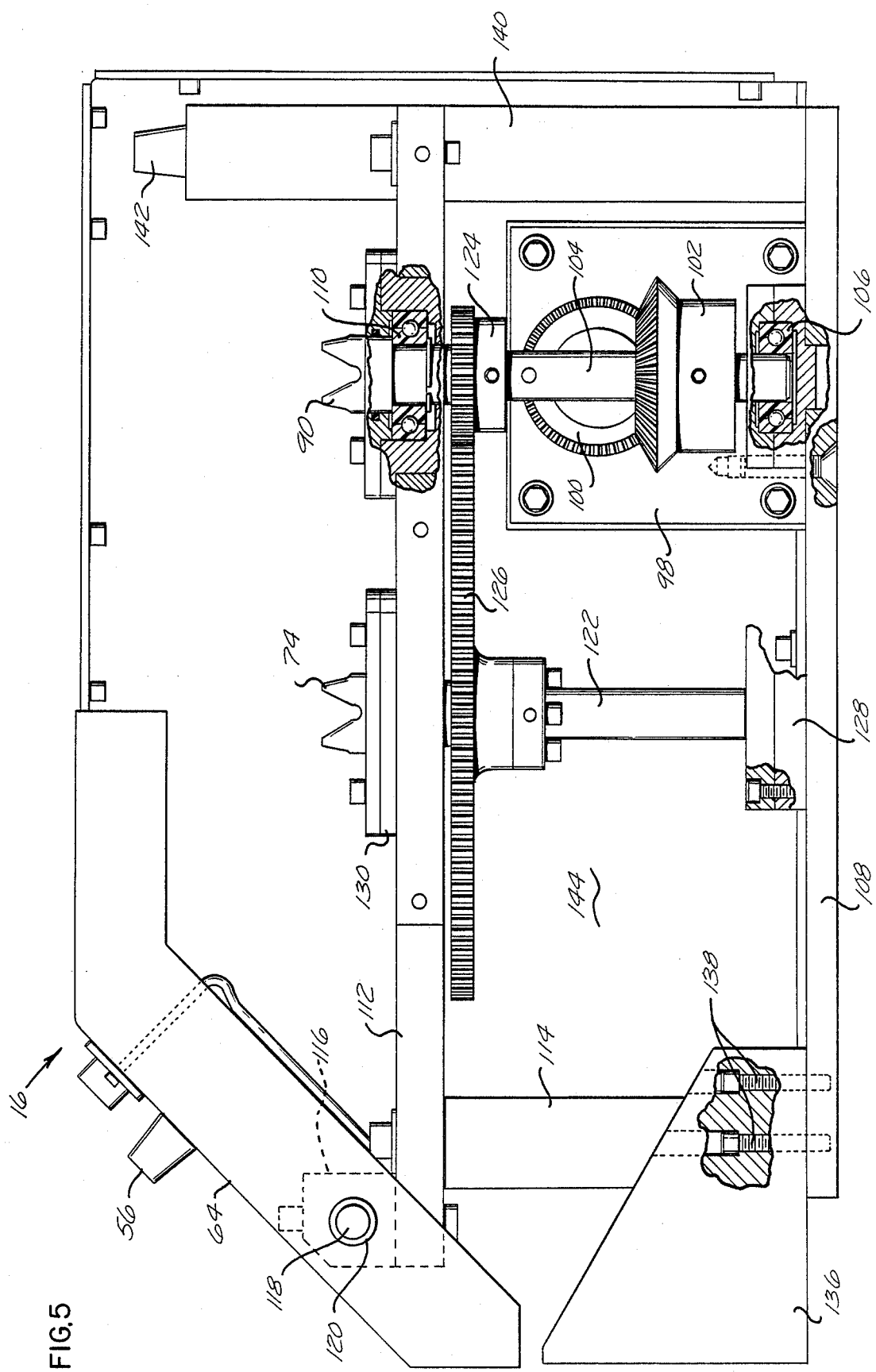
FIG. 5 is a side view of the arrangement of FIG. 4.
Figure 6:
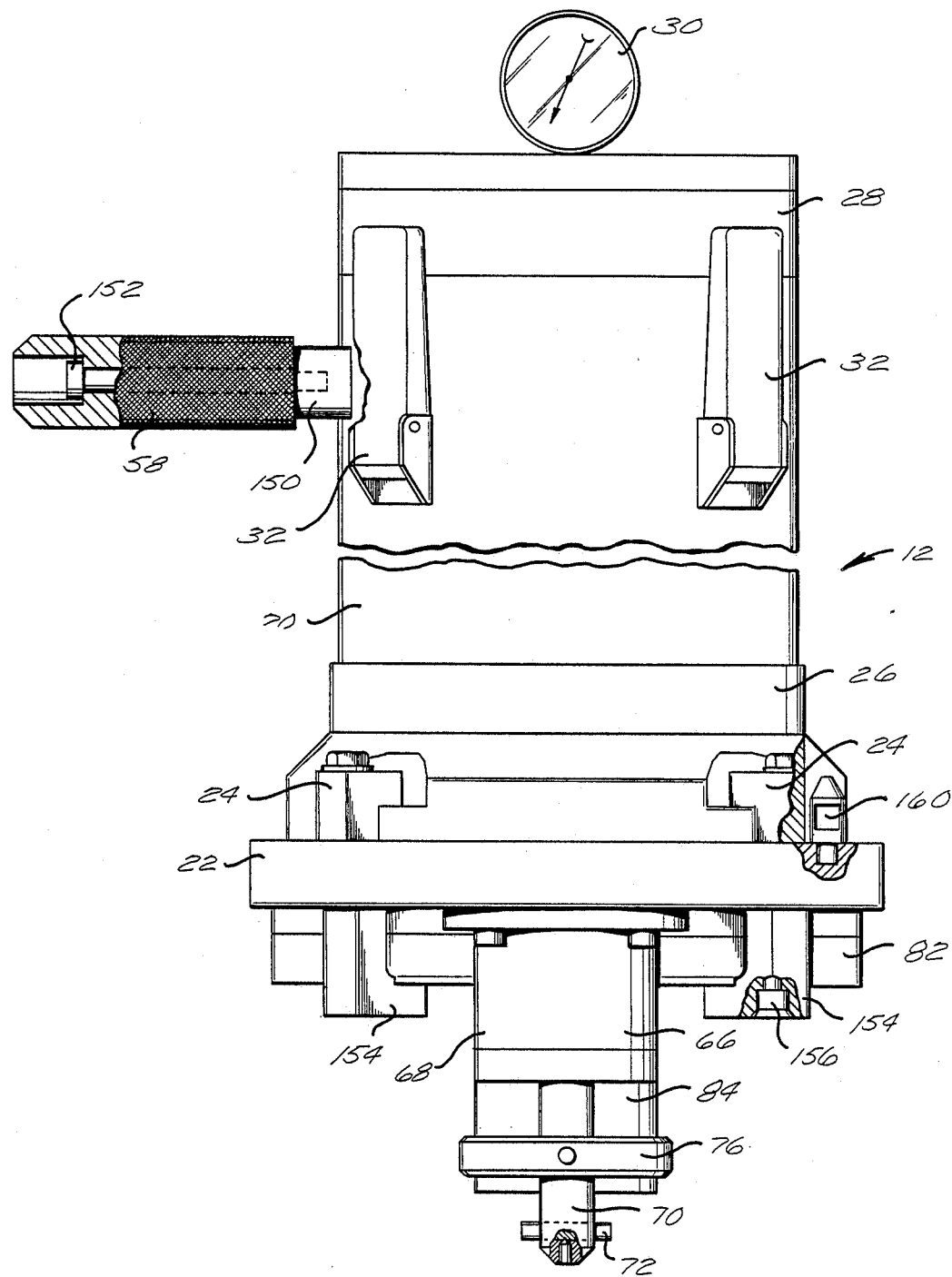
FIG. 6 is a front view of the cannister of the powder feeder of FIG. 1 showing the primary and secondary assemblies.

The details of the lower hopper assembly 16 which is mounted within the main chassis 14 beneath the upper hopper assembly 12 are shown in FIGS. 4 and 5. The lower hopper assembly 16 includes a single drive motor 98 which is coupled to drive both the primary assembly 66 and the secondary assembly 80 via the primary spindle 74 and the second spindle 90 respectively. The motor 98 mounts and rotatably drives a first bevel gear 100 which in turn engages and drives a second bevel gear 102 mounted on a vertically disposed shaft 104. The shaft 104 is mounted at its lower end by a ballbearing assembly 106 mounted n a base plate 108 at the bottom of the main chassis 14. The upper end of the shaft 104 is rotatably mounted by a ballbearing assembly 110 coupled to an upper plate 112.

The upper plate 112 is mounted above and generally parallel to the base plate 108 by a plurality of standoff posts 114 extending upwardly from the base plate 108 and engaging the underside of the upper plate 112. The forward edge of the upper plate 112 mounts a block 116 which is shown in dotted outline in FIG. 5 and which receives a generally horizontally disposed hinge shaft 118 therein. The hinge shaft 118 extends from the opposite ends of the block 116 into bearings disposed within the left and right pivot arms 62 and 64. FIGS. 4 and 5 show one of the bearings 120 which is mounted within the right pivot arm 64 and which receives an end of the hinge shaft 118. In this manner the pivot arms 62 and 64 are capable of pivoting about the opposite ends of the hinge shaft 118 to permit the upper hopper assembly 12 to be rotated into the powder dumping position.

When the drive motor 98 is operated, the first bevel gear 100 mounted on the shaft of the motor 98 is rotated so as to in turn drive the bevel gear 102 and thereby the secondary spindle 90 via the shaft 104. This action also drives a generally vertically disposed shaft 122 via a drive spur gear 124 mounted on the shaft 104 and engaging a driven spur gear 126 mounted on the shaft 122. The lower end of the shaft 122 is rotatably received within a ballbearing assembly 128 mounted on the base plate 108. The upper end of the shaft 122 is rotatably received within a ballbearing assembly 130 mounted on the upper plate 112. The primary spindle 74 is mounted on the upper end of the shaft 122.

The drive spur gear 124 and the driven spur gear 126 are of different diameters and are maintained in constant engagement such that the shaft 122 and the primary spindle 74 which is mounted thereon are driven at a speed different from and bearing a constant ratio to the speed of the shaft 104 and its included secondary spindle 90. In the present example the driven spur gear 126 has a diameter 4.5 times that of the drive spur gear 124 so that the secondary spindle 90 is driven at a speed 4.5 times that of the primary spindle 74. This constant relationship enables the primary assembly 66 to dispense proper amounts of powder to the secondary assembly 80 independent of the speed of the motor 98. As previously noted, the speed of the motor 98 is preferably controlled by a servo system which monitors the quantity of powder in the gas stream exiting the powder feeder via the powder hose 36. The motor 98 is speeded up or slowed down as necessary to provide a desired amount of powder in the gas stream.

As noted in connection with FIGS. 1 and 2 the stoppers 54 and 56 mounted on the pivot arms 62 and 64 engage the top surfaces of the stop blocks 50 and 52 respectively when the upper hopper assembly 12 is pivoted into the powder dumping position shown in FIG. 2. With the upper hopper assembly 12 in the powder dumping position, the left pivot arm 62 rests against a stop plate 134 (shown in FIG. 4) mounted on the base plate 108. Likewise, the right pivot arm 64 rests against a stop plate 136 which is also mounted on the base plate 108. As shown in FIG. 5 the stop plate 136 is secured to the base plate 108 by a plurality of fasteneing screws 138. The stop plate 134 is secured to the base plate 108 in similar fashion. When the upper hopper assembly 12 is in the upright position as shown in FIG. 1, the pivot arms 62 and 64 assume the positions shown in FIGS. 4 and 5. With the upper hopper assembly 12 in the upright position, the forward portion of the assembly 12 is supported by the hinge shaft 118. The rear portion of the upper hopper assembly 12 is supported by a pair of bumpers mounted at the top ends of a pair of main plate stops. One of the main plate stops 140 is shown in FIG. 5. The main plate stop 140 extends upwardly from the base plate 108 past the upper plate 112. Mounted at the top end of the main plate stop 140 is a bumper 142 for receiving the rear portion of the lower surface of the main plate 22 of the upper hopper assembly 12. A second main plate stop which is of like size and shape to the main plate stop 140 and which is not shown in FIGS. 4 and 5 is mounted on the other side of the lower hopper assembly 16 such that a bumper at the upper end thereof receives and helps to support the main plate 22.

Referring to FIG. 4 the lower hopper assembly 16 shown therein includes an internal wall 144 mounted on and extending generally vertically upwardly from the base plate 108 along one side of the base plate 108. The motor 98 is mounted on the internal wall 144. The internal wall 144 also supports one edge of the upper plate 112.

As also shown in FIG. 4, an electrical connector 146 is mounted on the left pivot arm 62 near the top end of the arm 62. The electrical connector 146 is coupled via a wire bundle 148 to a blanket heater (not shown) which may be placed around the powder cannister 20 and used to warm the powder within the cannister as desired.

The upper hopper assembly 12 is shown in greater detail in FIGS. 6–8. Referring to FIG. 6, the dump handle 58 includes a handle base 150 which is secured to the outer surface of the powder cannister 20. The dump handle 58 is coupled to the handle base 150 by a bolt 152.

The enclosed housing 82 is secured to the underside of the main plate 22 by a plurality of housing clamps 154. Two of the housing clamps 154 are shown in FIG. 6. Each of the housing clamps 154 includes a screw 156 which extends through the clamp 154 and into the main plate 22 to secure the clamp 154 and thereby the housing 82 to the underside of the main plate 22.

FIG. 6 also depicts an alignment pin 160 which is mounted on the top surface of the main plate 22. As shown in FIG. 8, the alignment pin 160 fits within a mating recess 162 in the side of the cannister base 26 so as to properly position the cannister 20 on the main plate 22.

FIGS. 7 and 8 show the primary assembly 66 in greater detail. As shown in FIG. 7 the primary bearing housing 68 mounts a lower ballbearing arrangement 164 and an upper ballbearing arrangement 166 on opposite sides of an outer bearing spacer 168 disposed within the primary bearing housing 68. The ballbearing arrangements 164 and 166 mount the primary drive shaft 70 for rotation about a generally vertical axis. A plurality of screws 170 secure a lower bearing cap 172 to the lower end of the primary bearing housing 68. The primary bearing housing 68 is itself secured to the main plate 22 by a plurality of screws 174.

Coupled to a threaded upper end 176 of the primary drive shaft 70 is a stir spindle assembly 178 which includes a spindle 180 and a stirring pin 182. The stirring pin 182 is mounted on the spindle 180 at the upper end of and in transverse relation to the spindle 180 so as to define a generally horizontal path of movement upon rotation of the primary drive shaft 70. This movement of the stirring pin 182 serves to agitate and break up the powder at the lower end of the powder cannister 20 as the powder is directed onto a powder feed impeller 186. The powder feed impeller 186 is coupled to the primary drive shaft 70 via a sub-ring 188 which is coupled to the shaft 70 immediately beneath the spindle 180.

The powder feed impeller 186 which rotates through a generally horizontal path of movement immediately above the upper surface of the main plate 22 is shown in detail in FIG. 8. As shown in FIG. 8 the powder feed impeller 186 has an outer periphery thereof consisting of four different fingers 190 defining relatively large apertures 192 therebetween. The lower end of the powder cannister 20 has an inside wall 194 which contacts the top surface of the main plate 22 around most of the powder feed impeller 186. At one portion 196, however, the inside wall 194 slopes gradually to a terminating location 198 immediately above an inner portion of the powder feed impeller 186 immediately adjacent the spindle 180.

As the powder feed impeller 186 rotates by virtue of rotation of the primary drive shaft 70, each of the fingers 190 moves under the portion 196 and into the region of a cavity 200. The cavity 200 extends from the upper surface of the main plate 22 through the bottom of the plate 22 and into the housing 82. The general shape of the aperture 200 is shown in dotted outline in FIG. 8. As shown in FIG. 7, the cavity 200 tapers in its cross-sectional area as it extends downwardly through the main plate 22 and into the inside of the housing 82. It was previously noted that the stirring pin 182 serves to agitate and breakup the powder at the bottom of the powder cannister 20. The powder as so agitated and broken up falls onto the powder feed impeller 186 where it falls into the apertures 192 between the fingers 190. As the powder feed impeller 186 rotates toward and then under the portion 196, a controlled amount of the powder is allowed to remain within each aperture 192 to a height approximately equal to the thickness of the powder feed impeller 186. This controlled amount of powder is pushed onto the top of the cavity 200 where the powder falls through the cavity 200 and into the housing 82 therebelow. It will therefore be seen that the action of the powder feed impeller 186 dispenses controlled amounts of powder through the cavity 200 and into the housing 82, with the rate of supply of such controlled amounts being determined by the speed of rotation of the primary drive shaft 70 and thereby the speed of the powder feed impeller 186.

As shown in FIG. 7 the enclosed housing 82 is coupled to the underside of the main plate 22 by a plurality of housing clamps 202. The housing 82 encloses a secondary feedwheel 204 which is mounted for rotation with the secondary drive shaft 86. The secondary feedwheel 204 which is shown and described in detail hereafter in connection with FIGS. 10–14 has a plurality of slots 206 circumferentially disposed about the upper surface of the feedwheel 204 at an outer peripheral portion thereof for receiving the powder dispensed through the cavity 200 by the powder feed impeller 186. A tamper assembly 208 is repeatedly forced downwardly onto the tops of the slots 206 to compact the powder within the slots 206.

The powder dropped and then tamped into the slots 206 in the secondary feedwheel 204 is entrained into a gas stream applied to the upper hopper assembly 12 via the gas source hose 34. The gas source hose 34 is coupled to a male elbow 210 shown in FIG. 7 and which is mounted on the top of a feedback gas in manifold 212. The manifold 212 which is mounted on the top of the main plate 22 communicates with the inside of the housing 82 so as to direct the gas flow through the powder filled slots 206 in the secondary feedwheel 204 as described hereafter. The gas flow with powder entrained therein is directed out through a fitting 214 which couples to the powder hose 36.

The pressure of the gas stream after it passes through the slots 206 in the secondary feedwheel 204 is communicated to the inside of the upper portion of the powder cannister 20 by a feedback tube subassembly 218. The feedback tube subassembly 218 includes a male adapter 220 coupled to the top of the feedback gas in manifold 212 and communicating with the inside of the housing 82 in a manner described hereafter in connection with FIG. 9. The male adapter 220 is coupled via a tube 222 to an elbow 224. The elbow 224 is mounted on the side of the powder cannister 20 adjacent the upper end of the cannister 20 so as to communicate with the inside of the cannister 20.

Referring to FIG. 9 the gas stream in the gas source hose 34 (not shown in FIG. 9) is applied to the male elbow 210 from which it flows downwardly through the feedback gas in manifold 212 and into a generally vertical passageway 226 at the lower end of the feedback gas in manifold 212. The passageway 226 directs the gas stream into a generally vertical but slightly sloped passageway 228 within an upper portion of the enclosed housing 82. The passageway 228 connects with a generally horizontally disposed passageway 230 at the bottom of the upper portion of the enclosed housing 82. The passageway 230 terminates at a fixed location relative to the rotatable secondary feedwheel 204 at one side of the slots 206. A passageway 232 disposed at a fixed location relative to the secondary feedwheel 204 on the opposite sides of the slots 206 from the passageway 230 has a central axis generally coincident with the central axis of the passageway 230.

The slots 206 in the secondary feedwheel 204 are defined by a plurality of vanes 236 formed in the top surface of the feedwheel 204. As the feedwheel 204 rotates, the vanes 236 and the slots 206 formed therebetween move through a narrow corridor 238 extending between the passageways 230 and 232. The slots 206 are filled with powder from the cannister 20 as they move through the narrow corridor 238. As the gas stream moves through the passageway 230 and then through the slots 206, the powder within the slots 206 is entrained into the gas stream. The gas stream with the powder entrained therein continues into the passageway 232 from which it flows into the fitting 214 and exits via the powder hose 36 (not shown in FIG. 9).

Figure 7:
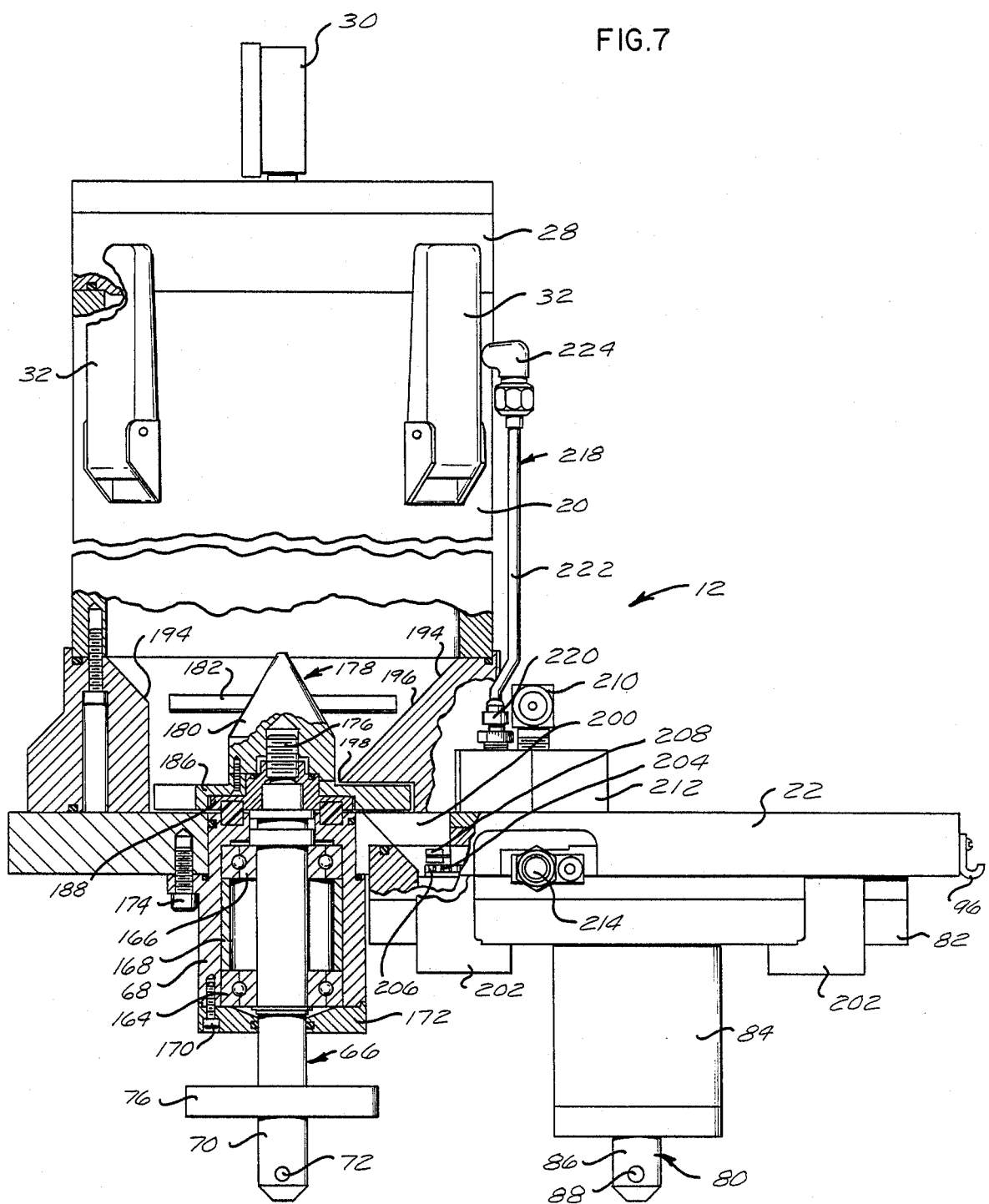
FIG. 7 is a side view, partly in section, of the arrangement of FIG. 6.

As previously noted in connection with FIGS. 7 and 8, the feedback tube subassembly 218 couples the male adapter 220 to the inside of the upper part of the powder cannister 20 via the tube 222 and the elbow 224. As shown in FIG. 9 the male adapter 220 is coupled to the passage 232 by a series of generally vertically disposed passageways including a passageway 240 within the feedback gas in manifold 212, a passageway 242 within the main plate 22 and a passageway 244 within the enclosed housing 82. This serves to equalize the pressure between the passageway 232 containing the gas stream with powder entrained therein and the top of the powder stored within the powder cannister 20.

Figure 10:
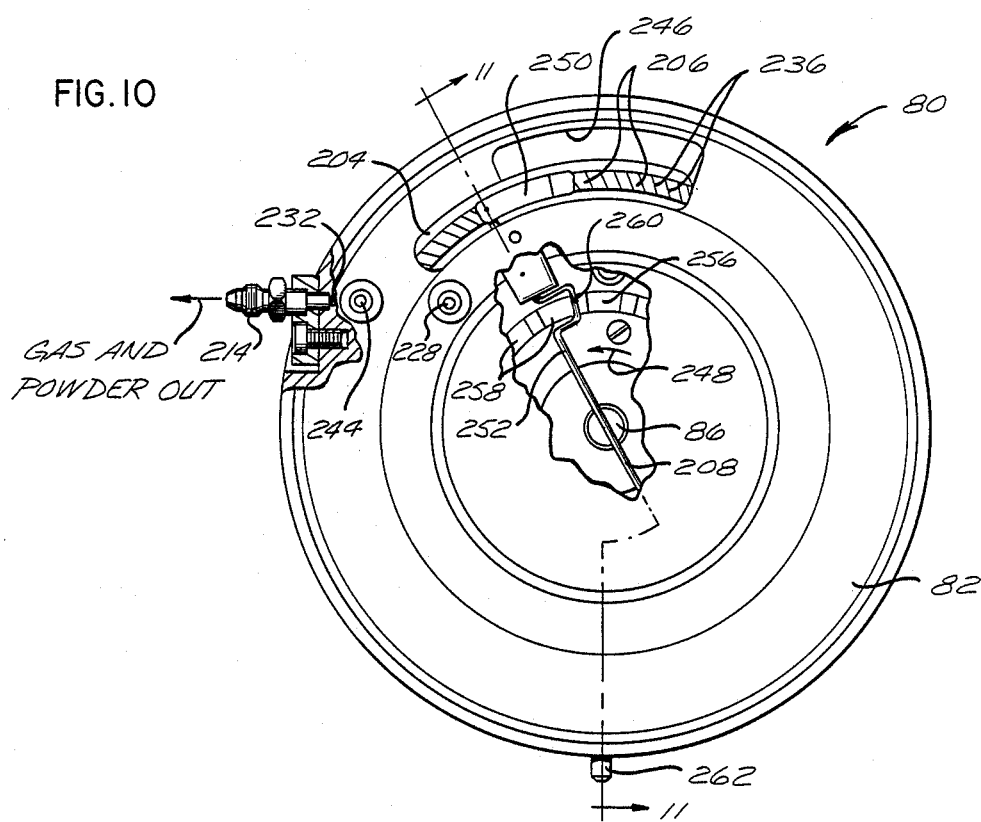
FIG. 10 is a top view, partly broken away, of the secondary assembly of the powder feeder of FIG. 1.
Figure 12:
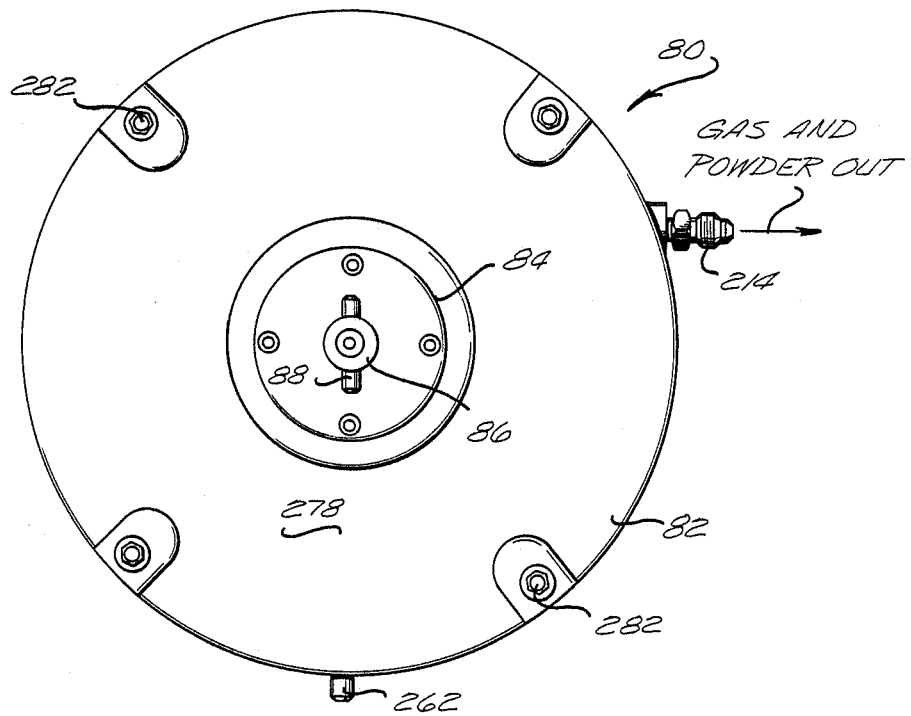
FIG. 12 is a bottom view of the secondary assembly of FIG. 10.
Figure 11:
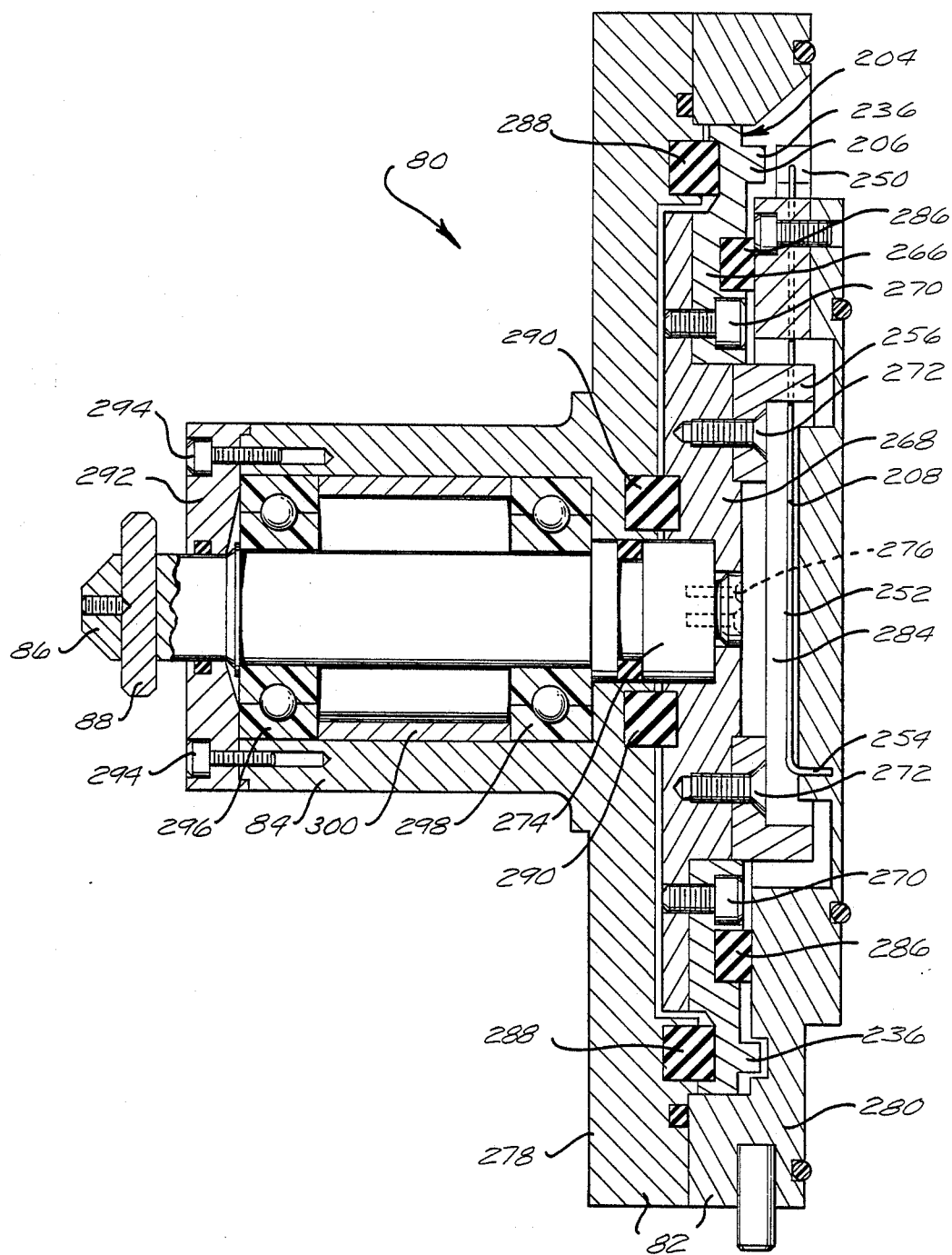
FIG. 11 is a sectional view of the secondary assembly of FIG. 10 taken along the line 11—11 thereof.

FIGS. 10–12 depict the secondary assembly 80 including the housing 82 which encloses the secondary feedwheel 204 and the tamper assembly 208, and the secondary drive shaft 86 and the secondary bearing housing 84. FIG. 10 is a top view of the secondary assembly 80 with a portion of the top of the enclosed housing 82 being broken away to show some of the details of the tamper assembly 208. The tamper assembly 208 is also shown in FIG. 11.

As described in connection with FIG. 7 the powder feed impeller 186 at the base of the powder cannister 20 advances controlled amounts of powder to the top of the cavity 200 in the main plate 22. The powder falls through the cavity 200 and through an opening at the top of the enclosed housing 82 to the slots 206 within the secondary feedwheel 204. The opening in the housing 82 through which the powder falls is shown as an opening 246 in FIG. 10. The secondary feedwheel 204 rotates in a counterclockwise direction as shown by an arrow 248. Accordingly, the slots 206 upon being filled with the powder are rotated under a tamper 250 which is mounted on the end of a tamper rod 252. As shown in FIG. 11 an end 254 of the tamper rod 252 opposite the tamper 250 extends into and is mounted within the top portion of the enclosed housing 82. The tamper 250 is mounted on the rod 252 so as to normally position the tamper 250 on top of the various vanes 236 in the absence of any twisting of the rod 252. Tamping action of the tamper 250 is achieved by repeatedly twisting the rod 252 via a tamper cam wheel 256 concentrically mounted on the top of the secondary feedwheel 204. The tamper cam wheel 256 is comprised of a succession of ramp-like portions 258 which repeatedly engage a generally U-shaped central portion 260 of the tamper rod 252 to provide twisting of the rod 252. As the tamper cam wheel 256 rotates, the ramp-like portions 258 thereof repeatedly raise and then lower the U-shaped central portion 260 of the tamper rod 252 so as to twist the rod 252 and thereby repeatedly raise and lower the tamper 250. The repetitive raising and lowering of the tamper 250 serves to compact the powder within the slots 206 as the slots advance toward the gas stream. The passageway 232 for the gas stream with the powder entrained therein is shown in FIG. 10 together with the fitting 214 through which the gas stream with the controlled amounts of powder therein exits. The upper ends of the passageways 228 and 244 where they enter the housing 82 are also shown in FIG. 10.

The enclosed housing 82 has an orienting pin 262 mounted therein at the outer periphery thereof, The orienting pin 262 aids in achieving the desired precise angular orientation of the secondary assembly 80 when the secondary assembly 80 is coupled to the underside of the main plate 22 using the housing clamps 202 shown in FIG. 7.

As shown in FIG. 11 the secondary feedwheel 204 consists of an outer ring-shaped portion 266 which is coupled to an inner hub portion 268 by screws 270. The tamper cam wheel 256 is mounted on the hub portion 268 of the secondary feedwheel 204 by screws 272.

The secondary feedwheel 204 is mounted on the secondary drive shaft 86 by the hub portion 268 which is attached to a hub 274 by a plurality of screws 276. The hub 274 is coupled to the end of the secondary drive shaft 86 opposite the drive pin 88.

The enclosed housing 82 is comprised of a housing base 278 and a mating housing cover 280 held together by screws 282 (shown in FIG. 12). The housing base 278 and cover 280 together define an inner cavity 284 configured to rotatably receive the secondary feedwheel 204 and the tamper cam wheel 256 therein. Various areas within the cavity 284 are sealed off from the powder receiving slots 206 at the outer periphery of the secondary feedwheel 204 by various different powder seals. The powder seals include a seal 286 between the underside of the housing cover 280 and the ring-shaped portion 266, a seal 288 between the upper surface of the housing base 278 and the ring-shaped portion 266, and a seal 290 between the bottom surface of the housing base 278 and the hub portion 268 adjacent the hub 274.

As shown in FIG. 11 the secondary bearing housing 84 extends outwardly from and forms a part of the housing base 278. A bearing housing cap 292 is secured over the outer end of the secondary bearing housing 84 by screws 294. The secondary drive shaft 86 is rotatably journaled within the secondary bearing housing 84 by a lower ballbearing arrangement 296 and an upper ballbearing arrangement 298. The ballbearing arrangements 296 and 298 are held apart within the secondary bearing housing 84 by an outer bearing spacer 300.

Figures 13, 14:
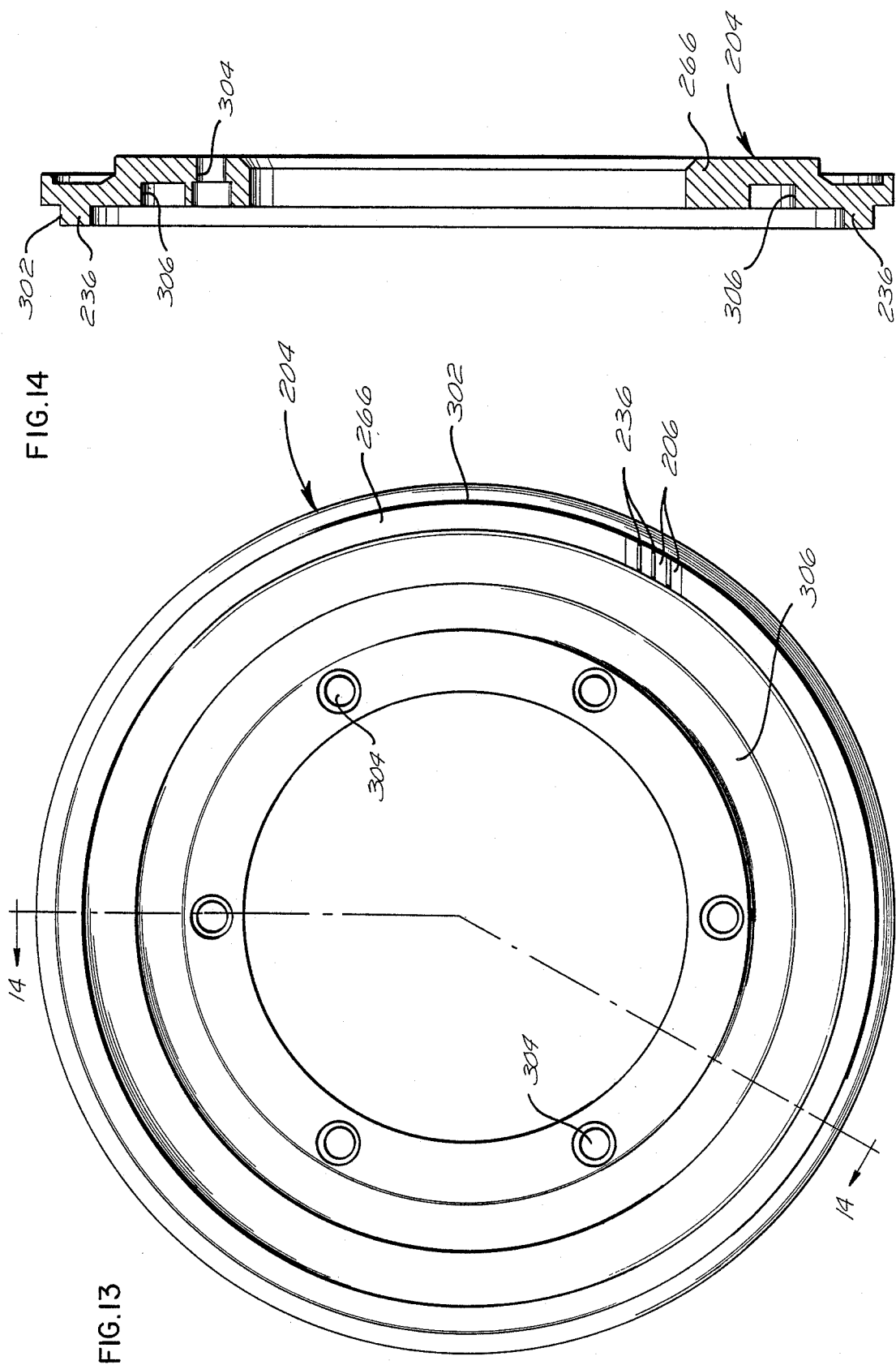
FIG. 13 is a plan view of a feedwheel used within the secondary assembly of FIG. 10.
FIG. 14 is a sectional view of the feedwheel of FIG. 13 taken along the line 14—14 thereof.

The ring-shaped portion 266 of the secondary feedwheel 204 is shown in FIGS. 13 and 14. As shown in FIG. 13 the vanes 236 extend around a circumferential portion 302 of the ring-shaped portion 266 to define the various powder receiving slots 206. Only a few of the vanes 236 and the slots 206 are shown in FIG. 13 for simplicity of illustration. The ring-shaped portion 266 has a plurality of apertures 304 therein for receiving the screws 270 which mount the ring-shaped portion 266 on the hub portion 268 as shown in FIG. 11. The upper surface of the ring-shaped portion 266 is provided with a circumferential groove 306 for receiving the seal 286 therein which is shown in FIG. 11.

FIG. 15 depicts two different portions of the ring-shaped portion 266 of the secondary feedwheel 204 including several of the vanes 236. The lefthand portion of FIG. 15 depicts a plurality of the slots 206 which are empty. The righthand portion of FIG. 15 depicts several of the slots 206 which are filled with small quantities 308 of powder. Each of the slots 206 is defined by a bottom surface 310 formed by the upper surface of the ring-shaped portion 266 of the feedwheel 204 and an opposite pair of side surfaces 312 provided by an adjacent pair of the vanes 236. The bottom surface 310 and the opposite side surfaces 312 within each of the slots 206 combine to provide the slots 206 with a uniform volume for receiving and retaining a substantially fixed, uniform quantity 308 of powder.

FIG. 16 shows several of the slots 206. In the present example there are 140 of the slots 206 around the circumferential portion 302 of the ring-shaped portion 266. Because the vanes 236 are of generally uniform thickness, the directions of elongation of each adjacent pair of the vanes 236 differ by slightly more than two degrees. Thus a second one 314 of the vanes 236 has a direction of elongation differing by slightly more than two degrees from the direction of elongation of a first one 316 of the vanes 236. A third one 318 of the vanes 236 has a direction of elongation which differs by slightly more than two degrees from the direction of elongation of the second one 314 of the vanes 236. A fourth one 320 of the vanes 236 has a direction of elongation differing by slightly more than two degrees from the direction of elongation of the third one 318 of the vanes 236. Accordingly, each of the slots 206 tapers very slightly in width from the outer end to the inner end thereof. This slight taper has virtually no effect on the ability of the small quantities of powder 308 to be completely entrained into the gas stream as each of the slots 206 passes between the passageways 230 and 232 shown in FIG. 9.

It will be seen from FIGS. 13, 15 and 16 that the various vanes 236 are not disposed radially but rather at acute angles relative to the radii of the feedwheel 204. This is principally so that the central axis of each slot 206 can generally coincide with the common central axis of the passageways 230 and 232 as the slot moves between the passageways 230 and 232. It has been found that orientation of the vanes 236 other than radially provides the advantage of a scooping action in which the vanes 236 tend to more readily scoop the powder dispensed from the cannister 20 into the slots 206 as the feedwheel 204 rotates beneath the lower end of the cavity 200.

It will be appreciated that the generally uniform small quantities 308 of powder loaded into the slots 206 provide for uniform and controlled feeding of the powder into the gas stream. The quantity of powder fed into the gas stream can be varied simply by changing the speed of rotation of the secondary feedwheel 204. As previously noted, a servo system may be employed to maintain a desired powder feed rate within the gas stream by monitoring the quantity of powder fed into the gas stream and varying the speed of the motor 98 so as to adjust the speed of the secondary feedwheel 204 accordingly. Because the shafts 104 and 122 always rotate in a fixed ratio which in the present example is 4.5:1 due to the constant engagement of the drive spur gear 124 and the driven spur gear 126 shown in FIG. 5, the secondary drive shaft 86 is always driven by a speed 4.5 times that of the primary drive shaft 70. This causes the powder feed impeller 186 to rotate at a speed which dispenses the proper quantities of powder to the secondary feedwheel 204 regardless of the speed of rotation of the feedwheel 204.

The uniformity of powder feed is further enhanced by a feature according to the invention which is illustrated in FIGS. 17A and 17B. This feature relates to the fact that the configuration of the slots 206 within the secondary feedwheel 204 presents a uniform cross-section of powder to the gas stream as the feedwheel 204 rotates past the gas stream. The flow of the gas stream onto the feedwheel 204 can be represented in terms of a "window" 322 which is illustrated in dotted outline in FIGS. 17A and 17B. In FIG. 17A the window 322 is depicted as being centered relative to a slot 206. As such, the window 322 comprises one-half the end area of each of the adjacent pair of vanes 236. Accordingly, the cross-sectional area of powder presented to the incoming gas stream within the window 322 consists of the area between the vanes 236. In FIG. 17B the feedwheel 204 has rotated slightly so that one of the vanes 236 is now completely contained within the window 322 to the exclusion of the other vanes 236. In this instance the area of the end of the single vane 236 within the window 322 is equal to the total area within the window 322 of the two vanes 236 in the example of FIG. 17A. At the same time the area of the powder in the example of FIG. 17B is equal to that of the example in FIG. 17A.

It will therefore be seen that the cross-sectional area of powder presented to the gas stream window 322 remains uniform as the various vanes 236 rotate through the window 322. This greatly helps in maintaining the feed of powder into the gas stream uniform.

While the invention has been particularly shown and described with reference to a preferred embodiment thereof, it will be understood by those skilled in the art that various changes in form and details may be made therein without departing from the spirit and scope of the invention.

What is claimed is:

1. An arrangement for providing a controlled amount of powder in a gas stream comprising the combination of:
   a rotatable feedwheel having a plurality of slots extending around an outer periphery thereof, the slots being of generally uniform size and each having a bottom and opposite sides defined by a pair of opposite vanes;
   means for feeding controlled amounts of powder into the slots in the feedwheel, the means for feeding including an enclosed hopper for storing powder, a feed impeller rotatably mounted at an end of the hopper at a fixed location relative to the feedwheel, and a first conduit extending from a first location in the path of the feed impeller to a second location adjacent the path of the feedwheel, the feed impeller being operative to dispense uniform quantities of powder from the hopper through the first conduit and into the slots in the feedwheel;

means for directing a gas flow through the slots in the feedwheel as the slots pass a fixed location at the outer periphery of the feedwheel;

a second conduit on the opposite side of the slots from the means for directing for receiving the gas flow and powder from the slot; and a third conduit coupled between the second conduit and the enclosed hopper to maintain pressure within the enclosed hopper substantially equal to pressure in the second conduit.

2. The invention set forth in claim 1, further including means for periodically tamping powder fed into the slots in the feedwheel.

3. The invention set forth in claim 1, wherein the feed impeller is located above the feedwheel, and the first conduit has an upper end disposed under a portion of the feed impeller at the first location and a lower end disposed above a portion of the outer periphery of the feedwheel at the second location.

4. The invention set forth in claim 1, further including a motor coupled to drive both the feedwheel and the feed impeller.

5. The invention set forth in claim 1, further including means for rotatably driving the feed impeller at a first rate and means for rotatably driving the feedwheel at a second rate different from and having a fixed ratio relative to the first rate.

6. The invention set forth in claim 1, further including a stir spindle rotatably mounted within the hopper adjacent the feed impeller and operative to mix powder within the hopper being provided to the feed impeller.

7. An arrangement for providing a controlled amount of powder in a gas stream comprising the combination of:

a closed container for storing a quantity of powder;

an impeller rotatably mounted adjacent the interior of the container for repeatedly dispensing relatively small, generally uniform quantities of powder from the container upon rotation;

a wheel rotatably mounted adjacent the impeller;

a first conduit extending from a first location adjacent the impeller to a second location adjacent the wheel, the conduit being operative to deliver the relatively small, generally uniform quantities of powder dispensed by the impeller to the wheel;

the wheel having a plurality of slots therein extending around the circumference thereof, each of the slots having a bottom surface and a pair of opposite side surfaces;

means mounted on one side of a path for the slots in the wheel for directing a gas stream through the slots;

a second conduit mounted on an opposite side of the path for the slots from the one side for receiving the gas stream and powder loaded in the slots; and a third conduit coupled between the second conduit and the closed container to maintain pressure within the closed container substantially equal to pressure within the second conduit.

8. The invention set forth in claim 7, wherein the slots in the wheel are formed by a plurality of vanes disposed in spaced-apart relation around a circumferential portion of the wheel.

9. The invention set forth in claim 7, wherein the impeller is rotatable about a first axis and the wheel is rotatable about a second axis generally parallel to and spaced apart from the first axis.

10. The invention set forth in claim 9, wherein the closed container is of hollow, generally cylindrical configuration and has a central axis generally coincident with the first axis.

11. The invention set forth in claim 9, further including a powder mixing member rotatably mounted about the first axis between the impeller and a supply of powder within the container.

12. A powder feeder comprising the combination of:

an enclosed powder cannister for storing a quantity of powder above a lower end thereof, the lower end having an aperture therein;

a feed impeller rotatably mounted about a first axis within the cannister at the lower end thereof and having apertures therein of predetermined size disposed to pass over the aperture in the lower end of the cannister as the impeller is rotated about the first axis;

a feedwheel rotatably mounted about a second axis generally parallel to and spaced apart from the first axis, the feedwheel being mounted below the lower end of the cannister, the feedwheel having a plurality of powder receiving areas therein of generally uniform size disposed circumferentially about the feedwheel;

a housing enclosing the feedwheel therein and having an aperture in an upper portion thereof above a location where the powder receiving areas pass as the feedwheel is rotated about the second axis;

a conduit coupling the aperture in the lower end of the cannister to the aperture in the upper portion of the housing enclosing the feedwheel;

a first hollow structure mounted in a fixed location relative to the feedwheel adjacent one side of the powder receiving areas; and a second hollow structure mounted in a fixed location relative to the feedwheel adjacent a side of the powder receiving area opposite the one side;

the feed impeller being rotated at a speed relative to the speed of rotation of the feedwheel and the apertures of predetermined size in the feed impeller and the conduit being dimensioned so as to fill the powder receiving areas of the feed wheel without substantially overfilling the powder receiving areas.

13. The invention set forth in claim 12, wherein the feed impeller comprises a bladed wheel mounted so that the blades pass over the aperture in the lower end of the cannister.

14. The invention set forth in claim 12, further including a first drive shaft rotatably mounted along the first axis and having the feed impeller mounted thereon and a second drive shaft rotatably mounted along the second axis and having the feedwheel mounted thereon.

15. The invention set forth in claim 14, further including a stir spindle mounted on the first drive shaft above the feed impeller and within the cannister.

16. The invention set forth in claim 14, further including means for rotatably driving the first and second shafts, the means for rotatably driving being operative to drive the second shaft at a speed different from and comprising a fixed ratio of the speed of the first shaft.

17. A powder feeder comprising the combination of:

a powder cannister for storing a quantity of powder above a lower end thereof, the lower end having an aperture therein;

a feed impeller rotatably mounted about a first axis within the cannister at the lower end thereof and having apertures therein of predetermined size disposed to pass over the aperture in the lower end of the cannister as the impeller is rotated about the first axis;

a feedwheel rotatably mounted about a second axis generally parallel to and spaced apart from the first axis, the feedwheel being mounted below the lower end of the cannister, the feedwheel having a plurality of powder receiving areas therein of generally uniform size disposed circumferentially about the feedwheel;

a housing enclosing the feedwheel therein and having an aperture in an upper portion thereof above a location where the powder receiving areas pass as the feedwheel is rotated about the second axis;

a conduit coupling the aperture in the lower end of the cannister to the aperture in the upper portion of the housing enclosing the feedwheel;

a first hollow structure mounted in a fixed location relative to the feedwheel adjacent one side of the powder receiving areas;

a second hollow structure mounted in a fixed location relative to the feedwheel adjacent a side of the powder receiving area opposite the one side;

a tamper cam wheel at an upper surface of the feedwheel, the tamper cam wheel defining a succession of undulating surfaces about a circumferential portion of the feedwheel;

a tamper shaft rotatably mounted adjacent the feedwheel and having a portion thereof extending outwardly therefrom and into contact with the tamper cam wheel; and a tamper mounted on a end of the tamper shaft and disposed adjacent the power receiving area of the feedwheel.

18. A powder feeder comprising the combination of:

a housing;

a powder hopper mounted on the housing and pivotable between a generally vertical operating position and a powder dumping position;

a primary assembly mounted at a bottom end of the hopper and having a first drive shaft, the primary assembly being operative to dispense predetermined amounts of powder from the hopper when the first drive shaft is rotatably driven;

a second assembly mounted at the bottom end of the hopper and having a second drive shaft and a plurality of powder receiving slots disposed to be filled with powder dispensed from the hopper when the second drive shaft is rotatably driven;

means for successively directing a stream of gas through different ones of the powder receiving slots in the secondary assembly;

a motor mounted within the housing;

means disposed within the housing for coupling the motor to drive the first drive shaft when the hopper is in the generally vertical operating position; and means disposed within the housing for coupling the motor to drive the second drive shaft when the hopper is in the generally vertical operating position.

19. The invention set forth in claim 18, wherein the means for coupling the motor to drive the first drive shaft and the means for coupling the motor to drive the second drive shaft together comprise third and fourth drive shafts rotatably mounted within the housing and operative to couple to the first and second drive shafts respectively when the hopper is in the vertical operating position, means coupling the motor to drive one of the third and fourth shafts, a first gear mounted on the third shaft and a second gear mounted on the fourth shaft and engaged with the first gear.

20. The invention set forth in claim 19, wherein the third and fourth shafts are generally vertically disposed and the motor is coupled to drive the fourth shaft through a pair of bevel gears.

* * * * *